(12) United States Patent
Yang et al.

(10) Patent No.: US 8,418,209 B1
(45) Date of Patent: Apr. 9, 2013

(54) MOBILE DEVICES FOR RECEIVING REAL-TIME DIGITAL TV

(75) Inventors: Dave Xiao Dong Yang, Beijing (CN); Joe Zheng, Cupertino, CA (US)

(73) Assignee: Silicon Valley Patent Agency, Inc., Cupertino, CA (US)

( * ) Notice: Subject to any disclaimer, the term of this patent is extended or adjusted under 35 U.S.C. 154(b) by 0 days.

(21) Appl. No.: 13/366,265

(22) Filed: Feb. 3, 2012

(51) Int. Cl.
 *H04N 7/16* (2011.01)
 *H04N 7/00* (2011.01)
 *H04N 5/46* (2006.01)
 *H04N 5/455* (2006.01)
 *H04H 20/71* (2008.01)
 *H04M 1/00* (2006.01)
 *H04J 3/06* (2006.01)

(52) U.S. Cl.
 USPC ............ 725/62; 348/552; 348/555; 348/726; 455/3.01; 455/556.1; 370/503

(58) Field of Classification Search ...................... 725/62
 See application file for complete search history.

(56) References Cited

U.S. PATENT DOCUMENTS

| | | | |
|---|---|---|---|
| 7,477,872 B2 * | 1/2009 | Fujii | 455/3.01 |
| 8,212,940 B2 * | 7/2012 | Yang et al. | 348/726 |
| 2007/0010194 A1 | 1/2007 | Lin | |
| 2009/0046209 A1 | 2/2009 | Lu | |
| 2010/0238358 A1 * | 9/2010 | Ma et al. | 348/725 |
| 2010/0302444 A1 * | 12/2010 | Ahn et al. | 348/569 |
| 2011/0075050 A1 * | 3/2011 | Ahluwalia et al. | 348/731 |
| 2012/0014372 A1 * | 1/2012 | Arambepola et al. | 370/350 |

\* cited by examiner

*Primary Examiner* — Chris Parry
(74) *Attorney, Agent, or Firm* — Joe Zheng

(57) ABSTRACT

Techniques for mobile devices to receive real-time digital TV are disclosed. To make such mobile devices (e.g., smart phones) readily usable regardless of what standard a local TV broadcast may comply with, more than one demodulators are provided. Each of the demodulators is implemented in accordance with one type of TV standard. Based on the received TV signal, a corresponding demodulator is activated to demodulate the TV signal. In one embodiment, the demodulators are implemented in software modules. Thus a missing demodulator may be downloaded from a designated site when a mobile device is configured to detect that a new demodulator needs installed to process a received TV signal.

17 Claims, 6 Drawing Sheets

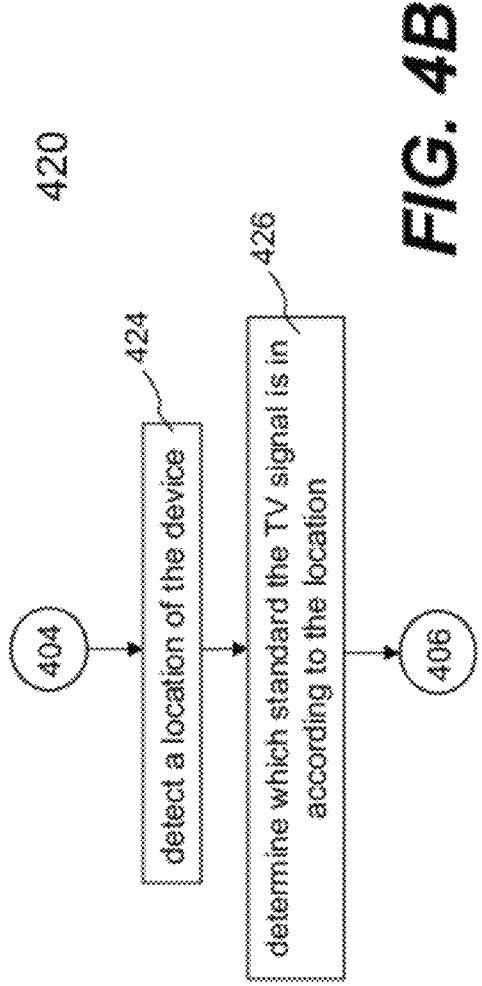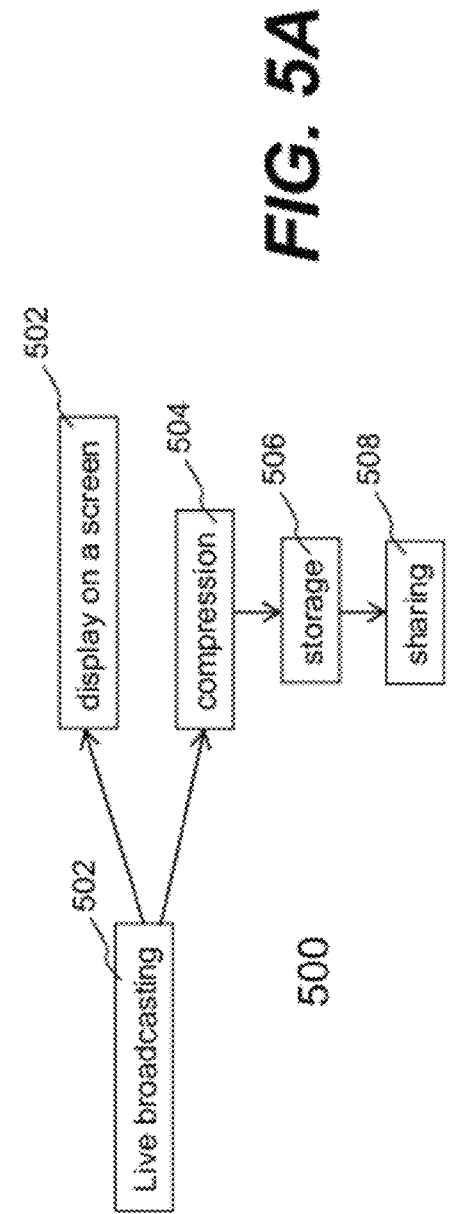

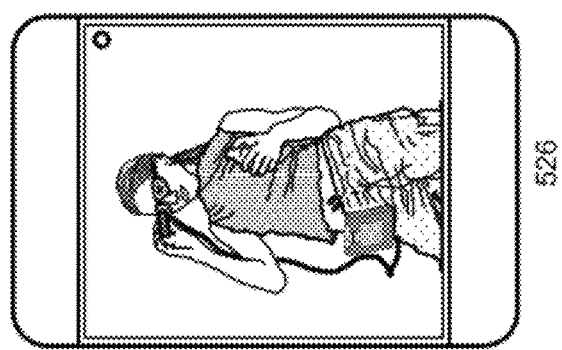
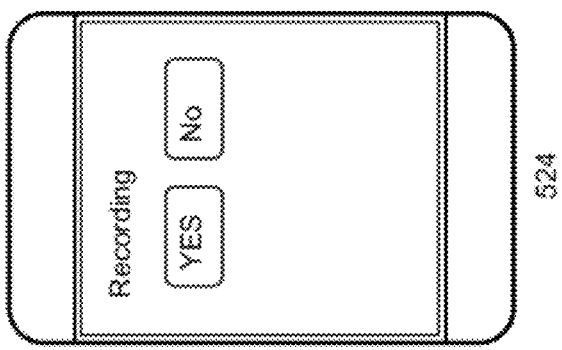
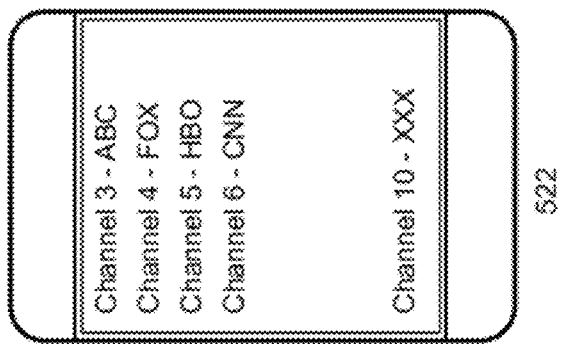
FIG. 5B

MOBILE DEVICES FOR RECEIVING REAL-TIME DIGITAL TV

BACKGROUND OF THE INVENTION

1. Field of the Invention

The present invention is related to the area of television (TV) devices. More particularly, the present invention is related to mobile devices capable of receiving digital or analog TV programs in any standards being broadcasted.

2. Description of Related Art

Smartphones, such as iPhone from Apple and Android-based phones from HTC or Motorola, are getting increasingly popular. Besides the regular cellular phone calls and short messaging, such a smartphone allows a user to be connected to the Internet from anywhere anytime via a wireless network (e.g., 3G, 4G or WiFi). As smartphones are getting more and more powerful in terms of computing power (e.g., memory, graphics, and processing speed), the expectation on a smartphone is beyond what a regular cellular phone was originally designed for. With a powerful processor and a proper connection speed, a smartphone can be used as an entertainment device, allowing a user to play a game alone or with others via a network, download media files from somewhere and conference with someone from anywhere.

Although a smartphone can be used to view a movie or receive TV footage, these movies or video clips are made available in advance so that a user of a smartphone can view one of the available sources by downloading corresponding data from a server. For example, iPhone is preinstalled with an application called "Youtube" that, once activated, causes the iPhone to be connected to a server operated by YouTube, LLC (www.youtube.com). Once connected, the user is provided with a list of available video clips. The user can start enjoying a selected video when one of the clips is selected, provided that the data representing the video is being streamed from the Youtube server to the iPhone via a wireless network (e.g., 3G, 4G or WiFi). If the connection to the server is disrupted, the view of the selected clip on the iPhone would be interrupted. In other words, the current video programs available on a smartphone are mostly based on data streaming or already downloaded from a server. The so-called TV programs are pre-prepared in data and placed on a server for data streaming requested by a user using a computing device (e.g., an iPhone or a laptop). For now, a smartphone cannot receive the broadcasting from the air if the smartphone is not redesigned or augmented.

In the TV arena, besides the traditional analog TV broadcasting that has been around nearly 90 years, digital video broadcasting (DVB) is being promoted. DVB is designed to offer better reception and especially good for receivers on the go. Accordingly, devices capable of receiving analog TV are being expanded to include more complicated hardware so that such devices are capable of receiving both analog and digital TV. However, similar to those devices designed only for receiving selected types of analog TV standards (e.g., NTSC, PAL or SECAM), these expanded devices are also labeled, for example, as DVB-T or ATSC, indicating they can receive digital TV in only selected standards but not all. In other words, a device for one type of digital TV (e.g., DVB-T) becomes unusable when the device is brought into an area being serviced with one type of digital TV (e.g., ATSC). In reality, there are more standards in digital TV than that in analog TV. For example, there are TDMB (Terrestrial Digital Multimedia Broadcasting), STiMi (Satellite Terrestrial Interactive Multi-service Infrastructure), DVB-T (Digital Video Broadcasting-Terrestrial), DVB-H (Digital Video Broadcasting-Handheld), ATSC (Advanced Television Systems Committee), MediaFLO (from Qualcomm), DMB (Digital Multimedia Broadcasting) and ISDB (Integrated Services Digital Broadcasting).

Although it is possible in theory to have a receiver capable of receiving digital TV in all standards, the current approach, primarily in baseband chip designs, would be too costly as the chip would have to include all circuits for all types of digital TV. Even such chips were ever designed, they would become obsolete immediately whenever a new digital TV standard is adopted.

There is, thus, a great need for a portable device such as a smartphone that would never become obsolete and be readily updated whenever a new digital TV standard is adopted. Further, such updating with a new TV standard shall happen at a minimum cost to the user while reception of the new TV standard is ready in seconds.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to a mobile architecture of a television (TV) receiving system that is based on two portions, a hardware portion and a software portion. The hardware portion includes a minimum amount of hardware to achieve operations of receiving a RF signal, producing an IF signal and outputting data representing the IF signal. The software portion, taking advantage of available computing power (e.g., high-speed microprocessor and a lot of memory) in a mobile device and executed therein, includes one or more demodulators, all implemented in software with no or minimum hardware support. Each of the demodulators is implemented in accordance with one type of TV standard. Thus depending on the received data, a corresponding demodulator is activated to demodulate the received data and subsequently produces audio and video data. One of the advantages, benefits and objects in the present invention is to have a portable mobile device capable of receiving all TV programs from the air regardless of the standards the TV signals being complied with.

The present invention may be implemented in various ways including an apparatus or a system. According to one embodiment, the present invention is a portable device (e.g., a smartphone) that comprises: an a converter tuned to receive a (radio frequency) RF signal for a television (TV) program in air, the converter including a TV antenna, a TV tuner, an analog-to-digital converter (ADC) and a processor configured to produce data representing the TV program; and a module executing in a mobile device to receive the data, the module including at least a first modulator configured to demodulate the data to produce an audio data stream and a video data stream. The module includes a plurality of modulators including the first modulator, each of the modulators configured to demodulate one type of TV signals in accordance with one TV standard. In one embodiment, the TV tuner is designed to receive the RF signal and produce an Intermediate frequency (IF) signal, the ADC, coupled to the TV tuner, receives the IF signal and produces the data representing the IF signal; and the converter further comprises an automatic gain controller (AGC) provided to ensure that the IF signal is properly produced for the TV program by the TV tuner.

According to another embodiment, the present invention a is method for receiving a television (TV) program in a smartphone, the method comprises: installing a converter in an enclosure for the smartphone, the converter including a TV antenna, a TV tuner, an analog-to-digital converter (ADC) and a processor configured to produce data representing the TV program; and loading a software module in a memory space, the software module to be executed by a processor in the smartphone when an option to view the TV program is activated, the software module including a bank of demodulators, each configured in accordance with one TV signal standard, and configured to demodulate the data being streamed from the converter to produce an audio data stream and a video data stream.

According to yet another embodiment, the present invention is a smartphone comprising: a wireless link providing functions of making or receiving cellular phone calls as well as sending or receiving short messages; a positioning link facilitating to determine a location of the smartphone; a television (TV) link capable of receiving a television (TV) program from air without using the wireless link, the TV link including a converter tuned to receive a (radio frequency) RF signal for the TV program, the converter including a TV antenna, a TV tuner, and an analog-to-digital converter (ADC) to produce data representing the TV program; and a processor; a memory space for storing a module to be executed by the processor to receive the data, the module including at least a first modulator configured to demodulate the data to produce an audio data stream and a video data stream.

One of the features, benefits and advantages in the present invention is to provide a TV receiving system that may be able to receive TV signals in all standards so that a user may receive live TV anywhere the user may go.

Other objects, features, and advantages of the present invention will become apparent upon examining the following detailed description of an embodiment thereof, taken in conjunction with the attached drawings.

BRIEF DESCRIPTION OF THE DRAWINGS

These and, other features, aspects, and advantages of the present invention will become better understood with regard to the following description, appended claims, and accompanying drawings where:

FIG. 4B shows a flowchart or process 40 for automatically determining what standard the TV broadcasts are in according to one embodiment of the present invention;

FIG. 5A shows a functional block diagram of receiving the TV live broadcasts in a local area according to one embodiment of the present invention; and FIG. 5B shows a set of displays that may be displayed on a mobile device according to one embodiment of the present invention.

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the invention are discussed below with reference to FIGS. 1-5B. However, those skilled in the art will readily appreciate that the detailed description given herein with respect to these figures is for explanatory purposes as the invention extends beyond these limited embodiments.

Figure 1:
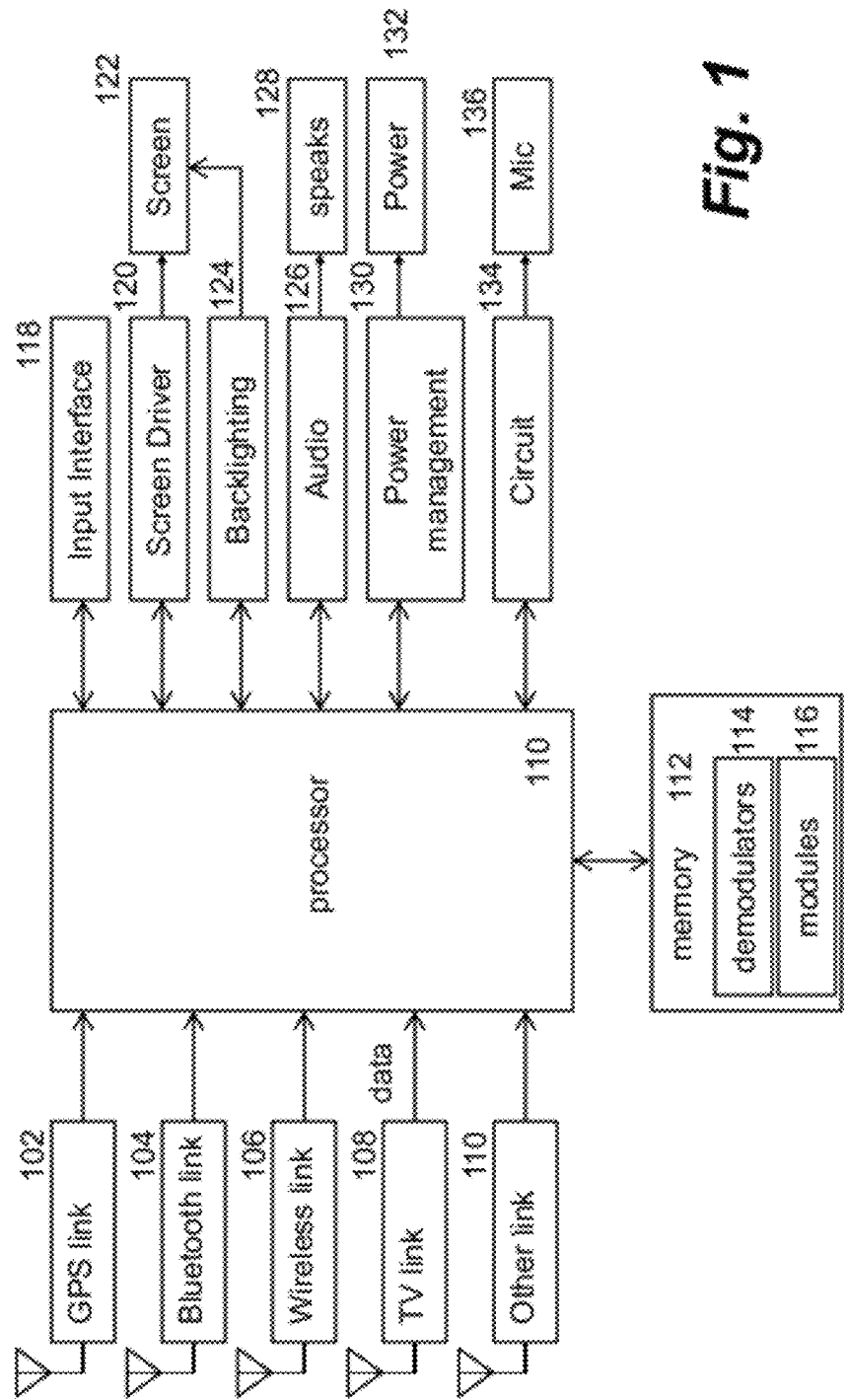
FIG. 1 shows an exemplary functional block diagram of a portable device (e.g., a smartphone) that is designed to provide the capability of receiving TV broadcasts, especially the digital TV broadcasts.
Figure 2:
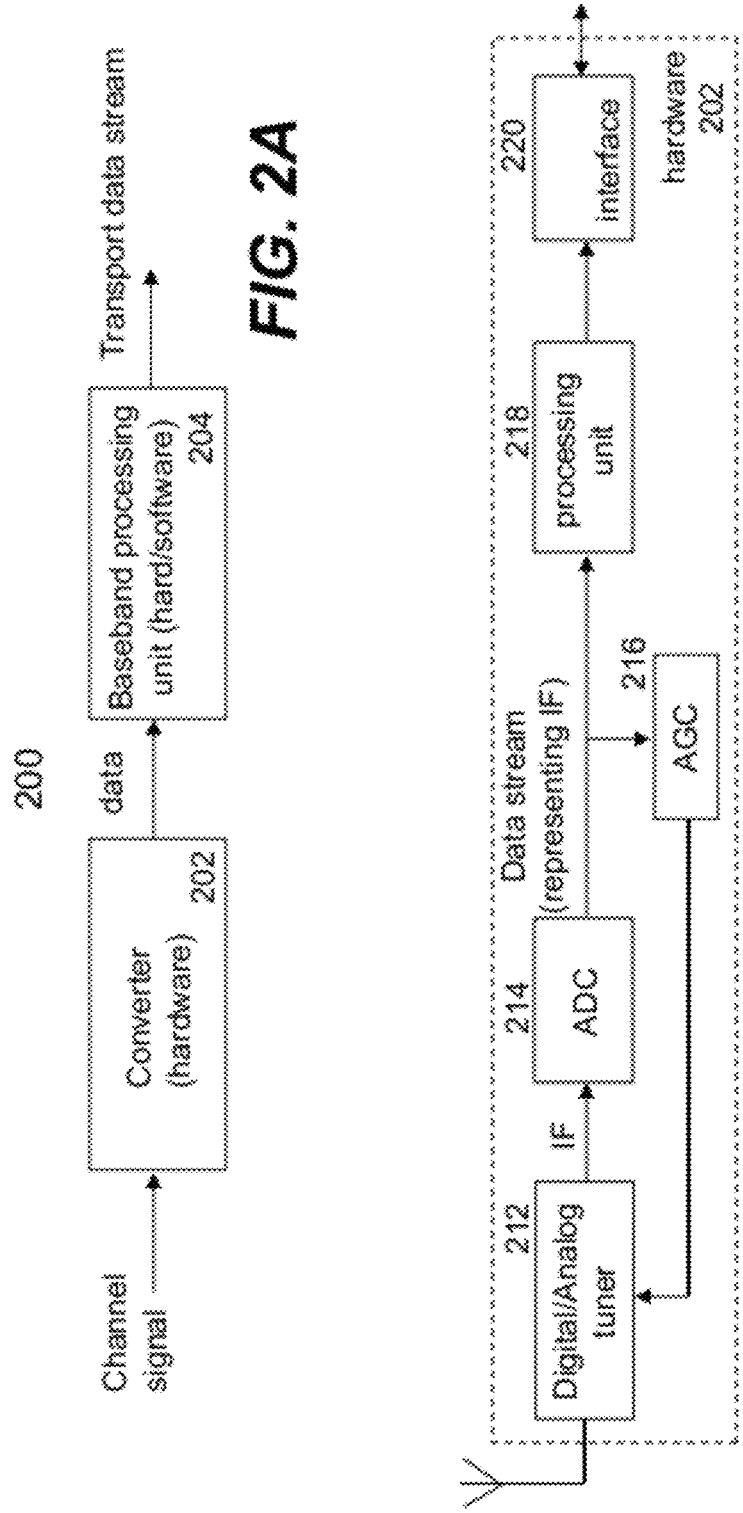
FIG. 2A shows an architecture of receiving TV live broadcasts in a portable device.
FIG. 2B shows a functional block diagram of one embodiment of FIG. 2A.

FIG. 1 shows an exemplary functional block diagram of a portable device 100 (e.g., a smartphone) that is designed to provide the capability of receiving TV broadcasts, especially the digital TV broadcasts. One of the advantages, benefits and objects in the present invention is that the portable device 100 is able to receive digital/analog TV programs in any standard. An example of the digital TV standard includes, may not be limited to, TDMB (Terrestrial Digital Multimedia Broadcasting), STiMi (Satellite Terrestrial Interactive Multi-service Infrastructure), DVB-T (Digital Video Broadcasting-Terrestrial), DVB-H (Digital Video Broadcasting-Handheld), ATSC (Advanced Television Systems Committee), MediaFLO (from Qualcomm), DMB (Digital Multimedia Broadcasting) and ISDB (Integrated Services Digital Broadcasting). The analog TV standard includes NTSC (National Television Standards Committee) primarily used in North America and Japan, PAL (Phase Alternating Line) used almost everywhere else in the world and SECAM (Sequential Color Memory) used in France, parts of Greece, Eastern Europe, Russia, Africa and a few other parts of the world.

As described herein, an example of the portable device 100 is a smart phone or smartphone. Those skilled in the art shall appreciate from the description herein that many computing devices may be implemented with one or more embodiments described herein. For example, whatever being described herein may be readily implemented in a tablet or a laptop computer. Unless explicitly stated, the use of smartphone or smartphones herein shall not be considered to be limited only to a cellular phone-type device.

The configuration or the smartphone 100 includes an array of links 102, 104, 106, 108 and 110, each designed for one function, not all of them shall be necessarily functioning at the same time. Depending on operation by a user, one or more of the links may be turned off, perhaps to reduce the power consumption. For example, a positioning or GPS (global positioning system) link 102 is provided to enable the smartphone 100 to provide GPS functions. In one embodiment, the GPS link 102, similar to a GPS device, receives GPS signals from a network of GPS satellites placed into orbit, and facilitate the determination of the location of the smartphone 100 in latitude and longitude. In another embodiment, similar to cellular GPS, the GPS link 102 is configured to receive signals from a service provider providing the location of the smartphone 100.

A bluetooth link 104 is provided to enable the smartphone 100 to communicate with another device in a short distance. With proper settings, the smartphone 100 can receive/send data from/to another device wirelessly. A wireless link 106 includes the cellular capability to allow a user of the smartphone 100 to make/receive a cellular call and short messages. The wireless link 106 is also provided to enable the smartphone 100 to communicate wirelessly over a data network (e.g., WiFi, 3G, and 4G or LTE). Some of these links are known to those skilled in the art and will not be further described herein.

A TV link 108 is provided to enable the smartphone 100 to receive real-time TV broadcasts from local TV stations. The TV link 108 outputs data to a silicon-based demodulator (not specifically shown) that produces demodulated data. According to one embodiment as shown in FIG. 1, as will be further detailed below, the TV link 108 outputs data to a processor 110 (e.g., a microprocessor or an application processor) that is configured to execute one or more software modules (e.g., a demodulator 113 and video processing 116) stored in a memory space 112 and process the data received from the TV link 108. The processed data is coupled to a screen driver 120 and audio driver 126, both respectively driving the screen 122 and one or more speakers 128. What is important about the TV receiving capability in the embodiment of the present invention is that the receiving of the TV broadcasts does not depend up the operation of the GPS link 102, the Bluetooth link 104 or the wireless link 106. According to one embodiment, once the TV link 108 is on, the smartphone 100 can be used as a portable TV receiver, allowing the user of the smartphone 100 to enjoy the local TV broadcasts.

An input interface 118 allows a user of the smartphone 100 to activate, for example, the TV function of the smartphone 100, manage available TV channels the smartphone 100 can receive at the time, and select a particular channel for the smartphone 100 to receive. An example of the input interface 118 is a touch screen commonly seen on iPhone®, where the user can input a command, make a selection and display a video as desired.

Most of the display screens in smartphones are LED backlighting. According to one embodiment, a backlighting driver 124 is provided to control the backlighting of the screen 122. The backlighting driver 124 is designed to synchronize with the displayed video signals to make the video display on the display screen 122 more efficient or vivid. For example, the backlighting is completely shut off when a scene is dark. The power management 130 is provided to control the power consumption of the power 132 energizing various components in the smartphone. A microphone (mic) 136 is provided as another man-to-machine interface, allowing the smartphone to accept a verbal instruction from a user. The designs of some of the blocks are well known in the art and will not be further described herein to avoid obstructing aspects of the present invention.

Referring now to FIG. 2A, it shows an architecture 200 of receiving TV live broadcasts in a smartphone. The architecture 200 includes two portions 202 and 204, one implemented in mainly hardware and the other implemented in hardware or mainly in software. According to one embodiment shown in FIG. 2B, the hardware portion 202 includes a RF (digital/analog TV) tuner 212, an analog-to-digital converter (ADC) 214, an automatic gain controller (AGC) 216, a compression unit 218 and an interface 220, some or all of these modules controlled by or operating with a processor or a microcontroller (not shown). Optionally, the hardware portion 202 may include an amplifier to amplify the received TV signal. When one embodiment of the present invention is to receive only digital TV, the hardware portion 202 may be slightly different. For example, the TV tuner 212 needs only to be a digital TV tuner.

In general, the tuner 212 is capable of receiving both analog and digital TV signals in the air. In one embodiment, the tuner 212 is an integrated tuner including two or more individual tuners, one for receiving the analog TV signals and the other one for receiving digital TV signals. It is assumed that the tuner 212 is tuned to a specified channel, the output from the tuner 212 is an intermediate frequency (IF) signal that is coupled to the ADC 214.

The IF signal is digitized by the ADC 214 (e.g., 10-bit or 12-bit). The data representing the IF signal from the ADC 214 is then coupled to a processing unit 218 that is designed to facilitate the data to be transported to the processor 110 of FIG. 1.

In one embodiment, the processing unit 218 is designed to compress the data to a type of data that can be transported to the processor 110 at or close to a predefined transmission rate. In another embodiment, the processing unit 218 is designed to filter out some data in accordance with a set of criteria (e.g., getting rid of some data beyond a certain frequency band). The AGC 214 is provided to adjust the IF signal (e.g., amplitude thereof) and provides a feedback adjusting signal to the tuner 212 so that the IF signal can be properly processed in the ADC 214, resulting in less errors in the subsequent processing.

Figure 3:
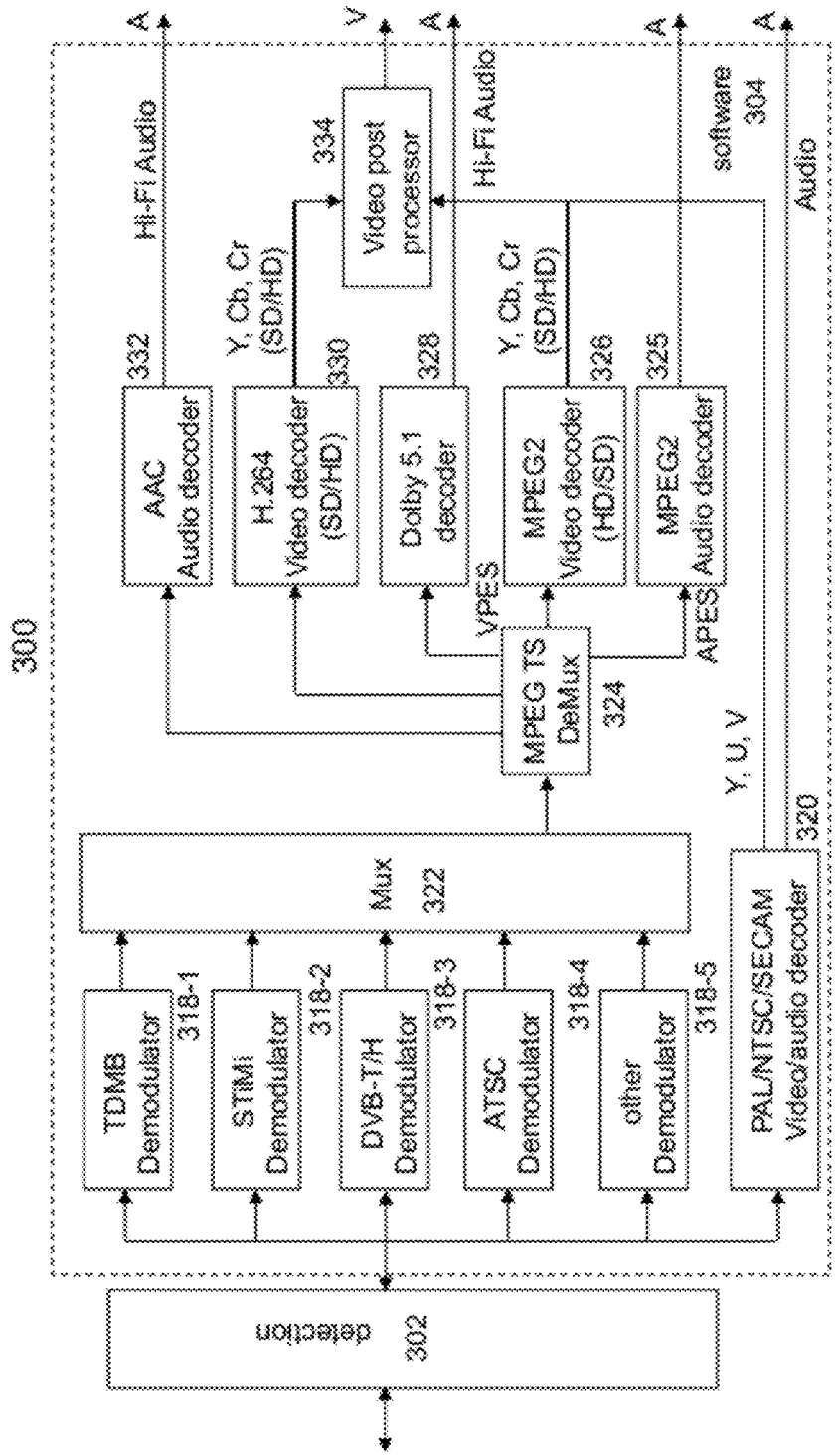
FIG. 3 shows a function block diagram of a baseband processing unit corresponding to a baseband processing unit in FIG. 2A.

Referring now to FIG. 3, it shows a function block diagram of a baseband processing unit 300 corresponding to the baseband processing unit 204 of FIG. 2A. In one embodiment, the baseband processing unit 300 is implemented with one or more software modules and includes an array of demodulators 318, each configured for one digital TV standard. For illustration purpose, there are shown four specific demodulators 318-1, 318-2, 318-3 and 318-4. Not shown in FIG. 3, the baseband processing unit 300 may optionally include a decompression engine as the software module 304 is receiving compressed data from the converter 202. The compressed data received therefrom is decompressed before the data is coupled to one of the demodulators 318 for demodulation.

As an example, the array of demodulators 318 includes four specific demodulators 318-1, 318-2, 318-3 and 318-4. Those skilled in the art shall understand that there are no limitations to the present invention regarding the number of demodulators in use or the type of demodulators in. When most or all of the demodulators are implemented in software, a less actively-used demodulator may be deleted from the memory to accommodate more frequently-used demodulators. With the availability of demodulators and minor controls to the converter 202 (e.g., readjusting the frequency band appropriate for the targeted RF), in one respect, a mobile device contemplated in the present invention can be used as a universal TV receiver. Depending on the channel signal being received, one of the demodulators 318 is activated to process the received and processed data from the converter 202. If a required demodulator is not available, the device 100 of FIG. 1 may be activated to activate an appropriate demodulator or download a corresponding demodulator.

Continued with the example shown in FIG. 3, the TDMB demodulator 318-1, designed in accordance with the South Korean terrestrial digital multimedia broadcasting standard, is configured to demodulate the received data representing digital TV signals in South Korea. STiMi (or CMMB) is a China-developed technology standard for broadcasting television signals to mobile phones. Accordingly, the STiMi demodulator 318-2 is configured to demodulate the received data representing digital TV signals in China. DVB-T and DVB-H are two popular European terrestrial and handheld digital TV standards. The DVB-T/H demodulator 318-3, which may be implemented separately for DVB-T or DVB-H, is configured to demodulate the received data representing digital TV signals in Europe or other countries adopting the standard. ATSC stands for Advanced Television Systems Committee which is a group that developed the ATSC digital television standard for the United States, also being adopted by other countries. The ATSC demodulator 318-4 is configured to demodulate the received data representing the ATSC TV signals. It can be appreciated that any demodulators may be readily installed because all demodulators in accordance with one embodiment of the present invention are implemented in software modules. The demodulator 318-5 is a representation of a demodulator designed to demodulate a specified digital TV standard (e.g., MediaFLO being promoted by Qualcomm Inc. DMB being prompted by China, or ISDB being promoted by Japan).

In one embodiment, only one of the demodulators is activated to process the received data by way of, for example, one or more indicator or flag in the data. For example, if the data coming from the converter 202 is from a digital TV in ATSC, the demodulator 318-4 is activated. In another embodiment, as shown in FIG. 3, a multiplexier (Mux) 322 is provided to select an output from one of the demodulators 318-1, 318-2, 318-3, 318-4 and 318-5 and couples the output to a transport demultiplexier (TS DeMux) 324. One of the functions provided by the TS DeMux 324 is to separate audio and video data. As most of the current digital TV signals carry data compressed in MPEG (a designation for a group of coding and compression standards for audio and video). The TS DeMux 324 is also referred to as MPEG TS DeMux. The outputs from the TS DeMux 324 are essentially two compressed data streams, a compressed audio data stream and a compressed video data stream.

Depending on the compression used in the original digital TV signals, the two compressed data streams from the TS DeMux 324 need to be coupled to a pair of corresponding audio and video decoders. It is assumed that the original digital TV uses MPEG2. The audio and video data streams from the TS DeMux 324 are referred to, respectively, as an audio packetized element stream or APES and a video packetized element stream or VPES. The APES and VPES from the DeMux 324 may be coupled to MPEG2 audio decoder 325 and MPEG2 video decoder 326. If the original digital TV uses a compression standard other than MPEG2, the audio data stream from the TS DeMux 324 is coupled to a Dolby 5.1 audio decoder 328 or a specialized audio decoder 332 (e.g., Advanced Audio Coding or AAC audio decoder) while the video data stream from the DeMux 324 may be coupled to a specialized video decoder 330 (e.g, H.264 video decoder). The audio output from the audio decoder 328 or 332 is coupled to one or more speakers or sometimes a sound card for amplification, if there is one, in the computing device, where sound is reproduced.

As far as the video is concerned, there are at least two modes, standard definition (SD) and high definition (HD), the video decoder 326 or 328 can be designed to process either one of the definitions. Alternatively, a video decoder for SD and a video decoder for HD may be provided at the same time, which is useful when a picture-in-picture (PIP) feature in the display is desired.

The component signals YCbCr are then coupled to a video post processor 334 in which various video enhancement and processing may be implemented. The output video signals from the video post processor 334 are coupled to a display screen associated with a computing device for display. As a result, the digital TV signal is reproduced. One of the most important features, benefits and advantages is that all types of digital TV, regardless of its standard, could be received in a system implemented in accordance with the baseband processing unit 300 of FIG. 3. Those skilled in the art can understand that it would cost enormous if a dedicated baseband chip is to be designed to accommodate all types of digital TV standards. Moreover, the baseband processing unit 300 of FIG. 3 can be readily expanded to work with an additional digital TV standard if there is one or any modification of an existing standard, while a dedicated baseband chip would immediately become obsolete when there is a new one or any modification of an existing standard.

Although digital TV broadcasting is a trend, the analog TV is not going away anytime soon. To accommodate the reception of the analog TV in PAL, NSTC or Secam, an analog video/audio decoder 320 is also included in the software module 304. The video/audio decoder 320 is provided to receive the data representing an analog TV signal from the USB port 316 and extract YUV. The YUV component signals are then coupled to the video post processor 334 in which various video enhancements, artistic effects and processing may be implemented. The output video signals from the video post processor 334 are coupled to a display screen associated with a computing device for display. The analog video/audio decoder 320 also produces an audio signal that may be coupled to speakers or via a sound card. As a result, the analog TV is reproduced.

Figure 4A:
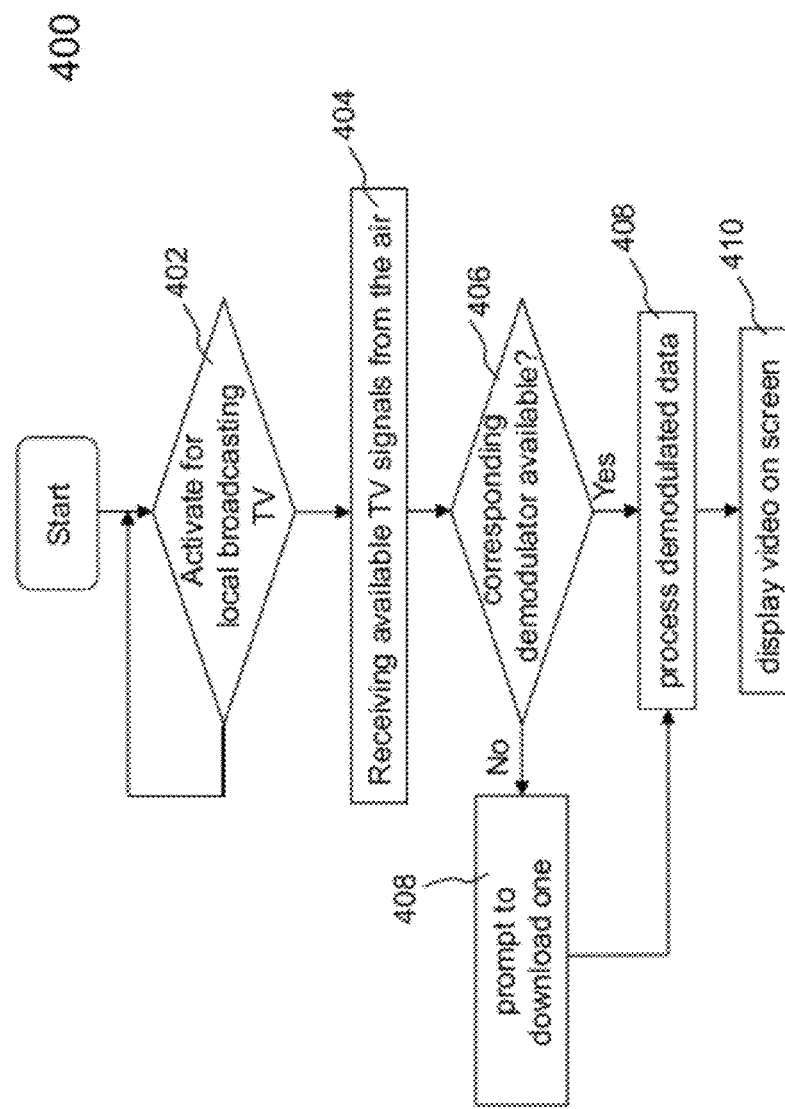
FIG. 4A shows a flowchart or process for receiving local TV broadcasts in a mobile device according to one embodiment of the present invention.

FIG. 4A shows a flowchart or process 400 for receiving local TV broadcasts in a mobile device according to one embodiment of the present invention. The process 400 may be implemented in hardware or in a combination of hardware and software. The drawings FIGS. 1-3 may be referenced to better understand the process 400.

The process 400 determines if a user has determined to receive a local TV broadcast at 402. Depending on implementation, different mechanisms may be implemented to put the mobile device into a condition to receive the TV. For example, an icon being displayed or a designated button may be activated by a user to start the reception of the TV.

According to one embodiment, the related circuits corresponding to the converter 202 of FIG. 2A are turned on to receive the TV signals from the air at 404. At 406, a detection circuit 302 of FIG. 3 detects what standards these TV signals are falling into. For example, when a user is using his/her mobile device to receive the local TVs in US, the detection circuit 302 shall indicate that the received digital TV signals are in compliance with ATSC. Based on the detected standard, the processor 110 of FIG. 1 is configured to detect if a corresponding demodulator is already installed and ready to demodulate the received signal(s). If a corresponding demodulator is not installed, a user may be promoted at 408 to download a corresponding demodulator from a designated server. In one embodiment, a link to the corresponding demodulator available for downloading from a server is embedded in an application installed in the mobile device, where the application is provided for the user to activate to watch a local TV broadcast. In another embodiment, a search engine is activated to find such a corresponding demodulator available for installation in the mobile device based on the location of the mobile device.

In any case, it is now assumed that the corresponding demodulator is installed in the mobile device, as one of the demodulators 114 in a memory space 112. The demodulator is now activated to demodulate the received data at 408. The TV program (e.g., CNN) is now streamed in and displayed on a display screen on the mobile device.

FIG. 4B shows a flowchart or process 420 for automatically determining what standard the TV broadcasts are in according to one embodiment of the present invention. The process 420 may be implemented in hardware or in a combination of hardware and software as modules in the mobile device. The process 420 may be used in the process 400 as another embodiment.

As described above, the mobile device is activated to receive the TV signals from the air at 404. The mobile device is also activated to detect where it is now located. As shown in FIG. 1, the mobile device is equipped with the ability to detect its own geographic location. Accordingly, the location is determined at 424. Based on the location, the standard for the TV signal in the location is publicly known. A corresponding demodulator can be automatically activated to proceed with the reception of the TV signals from the air.

FIG. 5A shows a functional block diagram 500 of receiving TV live programs being broadcasted in a local area according to one embodiment of the present invention. As a selected-channel TV signal is being received, a user of the mobile device has an option to store locally in the mobile device while watching the TV program.

As described above, the demodulated TV data is displayed at 502 on a screen after being processed (e.g., rescaled for the size of the display screen of the mobile device and various enhancement therefor). In one embodiment, a user is offered an option to store the TV program locally in the mobile device. To save the storage space, the video data is compressed at 504 (e.g., MP4). The compressed data is then stored in a storage device in the mobile device at 506. The stored TV program can be then shared with another user via the Internet (e.g., uploading the data to an account with Facebook to be viewed by a circle of friends or Youtube for public viewing).

In one embodiment, the video and audio signals from the demodulated TV data are transported to an external display (e.g., a TV) via a wired cable (e.g., a display port or HDMI, or RGB cables). As a result, the smartphone may be used as a live TV source to a larger screen to be enjoyed in a living room, for example.

FIG. 5B shows a set of displays that may be displayed on a mobile device according to one embodiment of the present invention. The display 522 shows that what TV programs (broadcasts) are available at the time in a particular location. Once one of the programs is selected, the display 524 offers the user an option to record the program, namely saving the TV data in the local storage device in the mobile device. While the selected TV is being displayed on the display screen, the data for the TV is compressed and saved in the storage at 508. Likewise, the TV stream may also be delivered to an external display device for display, the sound thereof is also reproduced on a set of external speakers.

Although exemplary embodiments of the present invention have been disclosed in detail, it will be apparent to those skilled in the art that various changes and modifications may be made to achieve the advantage of the invention. It will be obvious to those skilled in the art that some components may be substituted with another component providing same function. Accordingly, the scope of the present invention is defined by the appended claims rather than the foregoing description of embodiments.

We claim:

1. A mobile phone comprising:
   a converter tuned to receive a radio frequency (RF) signal for a television (TV) program in air, the converter including a TV antenna, a TV tuner, an analog-to-digital converter (ADC), and a processing unit configured to produce data representing the TV program;
   a module executing in the mobile phone to receive the data, the module including a plurality of demodulators, each of the demodulators configured to demodulate one type of TV signals in accordance with a TV standard; and
   a processor configured to detect a TV standard according to which the TV program is being broadcast, and cause one of the demodulators to be activated to demodulate the data to produce an audio data stream and a video data stream, or download a corresponding demodulator to process the data when the corresponding demodulator has not been included in the plurality of demodulators.

2. The mobile phone as claimed in claim 1, wherein each of the demodulators is implemented in software, and upgradeable from a server via a wireless network.

3. The mobile phone as claimed in claim 1, further comprising:
   a storage device; and
   a display screen configured to display an option to allow a user to store the data in the storage device.

4. The mobile phone as claimed in claim 3, wherein the processing unit is configured to compress the data according to a compression standard before the data is stored in the storage device.

5. The mobile phone as claimed in claim 1, wherein the TV tuner is designed to receive the RF signal and produce an Intermediate frequency (IF) signal, the ADC, coupled to the TV tuner, receives the IF signal and produces the data representing the IF signal; and the converter further comprises an automatic gain controller (AGC) provided to ensure that the IF signal is properly produced for the TV program by the TV tuner.

6. The mobile phone as claimed in claim 5, further comprising a compression unit provided to receive the data and compress the data to a size readily coupled to the one of the demodulators via an interface in the mobile phone.

7. The mobile phone as claimed in claim 6, wherein the module includes a decompression unit that is configured to decompress the data received from the interface.

8. The mobile phone as claimed in claim 1, further comprising:
   a display screen configured to display video in the video data stream;
   at least one speaker to reproduce sound in the audio data stream; and
   a port to transport the video and sound to an external display screen via a wired cable or wirelessly.

9. The mobile phone as claimed in claim 1, wherein the RF signal is one of a digital TV signal and an analog TV signal.

10. The mobile phone as claimed in claim 9, wherein the digital TV signal is in accordance with a standard.

11. The mobile phone as claimed in claim 10, wherein the standard is one of a TDMB, STiMi, DVB-T, DVB-H, ATSC, MediaFLO, DMB and ISDB.

12. A method for receiving a television (TV) program in a mobile phone, the method comprising:
   receiving the TV program from air by a converter tuned to receive a radio frequency (RF) signal for the TV program, the converter including a TV antenna, a TV tuner, an analog-to-digital converter (ADC), and a processing unit to produce data representing the TV program;

demodulating the data being streamed from the converter to produce an audio data stream and a video data stream by a bank of demodulators, each of the demodulators configured to demodulate one type of TV signals in accordance with one TV standard;

detecting, by a processor, the TV standard in which the TV program is being broadcast, and activating one of the demodulators to process the data after the TV standard is detected to correspond to the one of the demodulators, or downloading a corresponding demodulator to process the data when the corresponding demodulator has not been included in the bank of demodulators.

13. The method as claimed in claim 12, wherein each of the demodulators is implemented in software, and downloadable from a server via a wireless network.

14. The method as claimed in claim 12, further comprising:

detecting if the corresponding demodulator is in the bank of demodulators; and causing the mobile phone to download the corresponding demodulator from a server provided to supply the demodulators necessary for the mobile phone to receive all types of TV broadcasts in the world.

15. The method as claimed in claim 14, wherein the TV tuner is designed to receive the RF signal and produce an Intermediate frequency (IF) signal, the ADC, coupled to the TV tuner, receives the IF signal and produces the data representing the IF signal; and the converter further comprises an automatic gain controller (AGC) provided to ensure that the IF signal is properly produced for the TV program by the TV tuner.

16. A mobile phone comprising:

a wireless link providing functions of making or receiving cellular phone calls as well as sending or receiving short messages;

a positioning link facilitating to determine a location of the mobile phone;

a television (TV) link capable of receiving a television (TV) program from air without using the wireless link, the TV link including a converter tuned to receive a radio frequency (RF) signal for the TV program, the converter including a TV antenna, a TV tuner, and an analog-to-digital converter (ADC) to produce data representing the TV program; and a processor;

a memory space for storing a module to be executed by the processor to receive the data, the module including a plurality of demodulators, each of the demodulators configured to demodulate one type of TV signals in accordance with a TV standard, wherein the processor is configured to detect the TV standard according to which the TV program is being broadcast, and cause one of the demodulators to be activated to demodulate the data to produce an audio data stream and a video data stream or download a corresponding demodulator to process the data when the corresponding demodulator has not been included in the plurality of demodulators.

17. The mobile phone as recited in claim 16, wherein each of the demodulators or the corresponding demodulator is updateable from a sever via a network.

\* \* \* \* \*